(12) United States Patent
Stone et al.

(10) Patent No.: US 7,930,994 B2
(45) Date of Patent: Apr. 26, 2011

(54) BIRD FEEDER HAVING AN ADJUSTABLE HANGING CABLE

(75) Inventors: John Stone, Vail, CO (US); Benjamin Beck, Boston, MA (US); Thomas Hagerty, Plymouth, MA (US); Douglas Marsden, Marblehead, MA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 11/494,225

(22) Filed: Jul. 27, 2006

(65) Prior Publication Data

US 2008/0022936 A1 Jan. 31, 2008

(51) Int. Cl.
*A01K 61/02* (2006.01)
(52) U.S. Cl. ...................................... 119/52.1
(58) Field of Classification Search ............... 119/52.1, 119/52.2, 52.4, 57.8; 242/385, 382, 382.6, 242/384.7
See application file for complete search history.

(56) References Cited

U.S. PATENT DOCUMENTS

| 1,927,216 | A | * | 9/1933 | Porter et al. | 242/379 |
|---|---|---|---|---|---|
| 1,945,842 | A | * | 2/1934 | Witchger | 33/767 |
| 2,935,108 | A | * | 5/1960 | Hall | 220/780 |
| 4,556,184 | A | * | 12/1985 | O'Sullivan | 248/330.1 |
| 5,178,619 | A | * | 1/1993 | Galazaka | 606/41 |
| 6,904,872 | B2 | * | 6/2005 | Muller | 119/796 |
| 7,096,821 | B2 | * | 8/2006 | Ruff | 119/51.01 |
| 2005/0172914 | A1 | * | 8/2005 | Woodruff | 119/796 |

* cited by examiner

*Primary Examiner* — Timothy D Collins
*Assistant Examiner* — Valentina Xavier
(74) *Attorney, Agent, or Firm* — Jacobson Holman PLLC

(57) ABSTRACT

A bird feeder provides a feed hopper constructed concentrically around a vertical central axis and having a plurality of feeding ports evenly distributed around the central axis, and a cable reel mounted to the feed hopper and adapted to store and provide a cable for supporting the bird feeder along the central axis.

21 Claims, 5 Drawing Sheets

BIRD FEEDER HAVING AN ADJUSTABLE HANGING CABLE

FIELD OF THE INVENTION

The present application generally relates to bird feeders and particularly to bird feeders that are adapted to be hung by cable.

BACKGROUND OF THE INVENTION

Bird feeders are frequently hung to provide optimal positioning for viewing and to limit access by other animals. Users of such bird feeders typically have to determine an appropriate length for a hanging cord and have to tie suitable reliable knots in weatherproof cord to achieve the desired hanging height. This procedure may be repeated when a user wishes to experiment with different feeder locations and hanging heights. It is desirable to have a hanging bird feeder which eliminates these inconveniences.

SUMMARY OF THE INVENTION

In one embodiment of the present invention, a bird feeder, comprises a feed hopper constructed concentrically around a vertical central axis and having a plurality of feeding ports evenly distributed around the central axis, and a cable reel mounted to the feed hopper and adapted to store and provide a cable for supporting the bird feeder along the central axis.

The cable reel may be substantially centered along the central axis to help maintain balance of the bird feeder. The bird feeder may further comprise a housing located around the cable reel for esthetic purposes. The cable reel may include a locking mechanism adapted to provide adjustability to a length of cable extending from the reel, and the cable reel may be a spring wound reel adapted to recoil the cable with release of the locking mechanism.

In another embodiment of the present invention, a bird feeder, comprises: a feed hopper having a multiplicity of feeding ports distributed there around and a conduit located along a central axis through the hopper from an underside of the hopper; and a cable reel mounted to the underside of the feed hopper and adapted to feed a cable through the conduit and out of a top of the hopper, wherein the cable reel and the cable are adapted to support the bird feeder by hanging with the cable.

The cable reel may include a locking mechanism adapted to provide adjustability to a length of cable extending from the reel, through the conduit and beyond the top of the hopper. The cable reel may be a spring wound reel adapted to recoil the cable with release of the locking mechanism.

The bird feeder may further comprise a housing located around the cable reel for esthetic purposes and attached to a bottom of the hopper. The housing may include an upper portion having a centrally located opening allowing the cable to pass upwardly through the conduit from the cable reel. The upper portion of the housing may include a circumferential extension forming a dish-like member around a lower portion of the feed hopper and below the feeding ports. The dish-like member may include a peripheral edge adapted to function as a perch for birds. The feed hopper may include a base portion having a centrally located opening there through adapted to locate the conduit along the central axis of the hopper.

The housing may include a lower portion adapted for capturing the cable reel with attachment of the lower portion to the upper portion of the housing. The cable reel may include an axel adapted for rotationally fixed mounting between the upper and lower portions of the housing. The axel may be mounted for movement along an axis thereof for allowing rotational movement of the cable reel. The cable reel may include elements adapted to engage the housing to prevent rotation thereof and the feeder may further comprise a spring bias mechanism adapted to cause engagement between the cable reel elements and the housing. The cable reel may be a spring wound reel adapted to recoil the cable with disengagement between the cable reel elements and the housing.

The feed container may include an outer wall with an open top end, and the feeder may further comprise a cross member extending across the open top end and through the central axis of the feed hopper and having a centrally located opening for allowing the cable to pass there through. The cross member may be adapted to engage the conduit in the centrally located opening of the cross member. The hopper may include a cover, and the feeder may further comprise a releasable catch adapted to engage the cover and to releasably engage the cross member to releasably affix the cover to the top of the feed hopper to allow filling of the hopper. The releasable catch may include one or more push buttons extending through the cover and adapted to enable disengagement between the catch and the cross member. The cover may include a centrally located opening for allowing the cable to pass there through, and adapted to allow the cover to be raised from the feed hopper and along the cable. The feed hopper may have a circular cross section.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
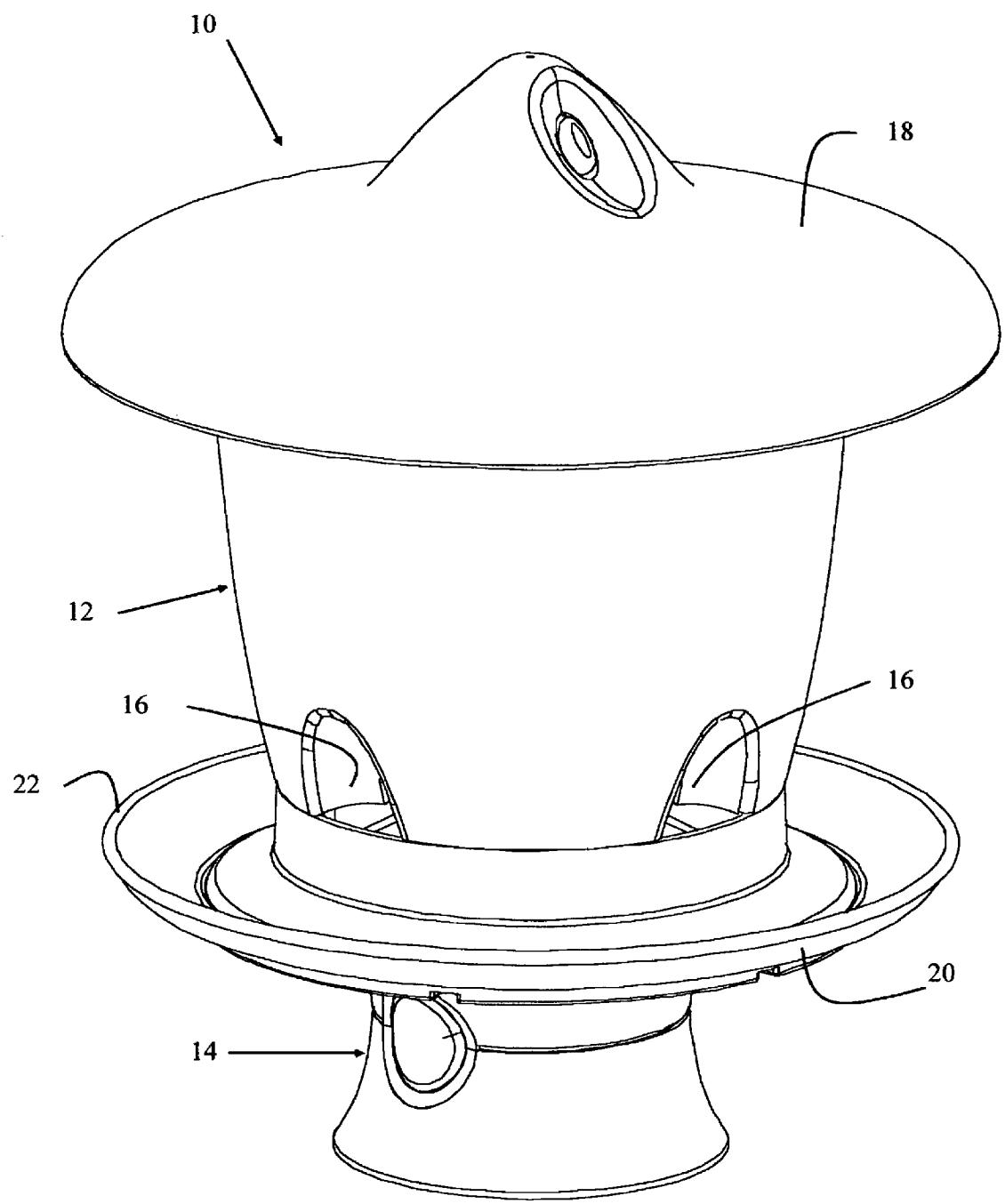
FIG. 1 is a perspective view of a bird feeder constructed in accordance with one embodiment of the present invention.

FIG. 1 shows a bird feeder 10 generally including a feed hopper 12 and a lower housing 14. Feed hopper 12 includes a multiplicity of feeding ports 16 located around a periphery of hopper 12 and evenly distributed to provide balance to bird feeder 10. Feed hopper 12 also includes a removable top 18 to allow hopper 12 to be refilled with bird feed. A portion of housing 14 forms a dish 20 surrounding hopper 12 and below feeding ports 16. Dish 20 includes a peripheral edge 22 which functions as a perch for feeding birds, and also catches seeds which fall out of feeding ports 16 to reduce spillage losses.

Figure 2:
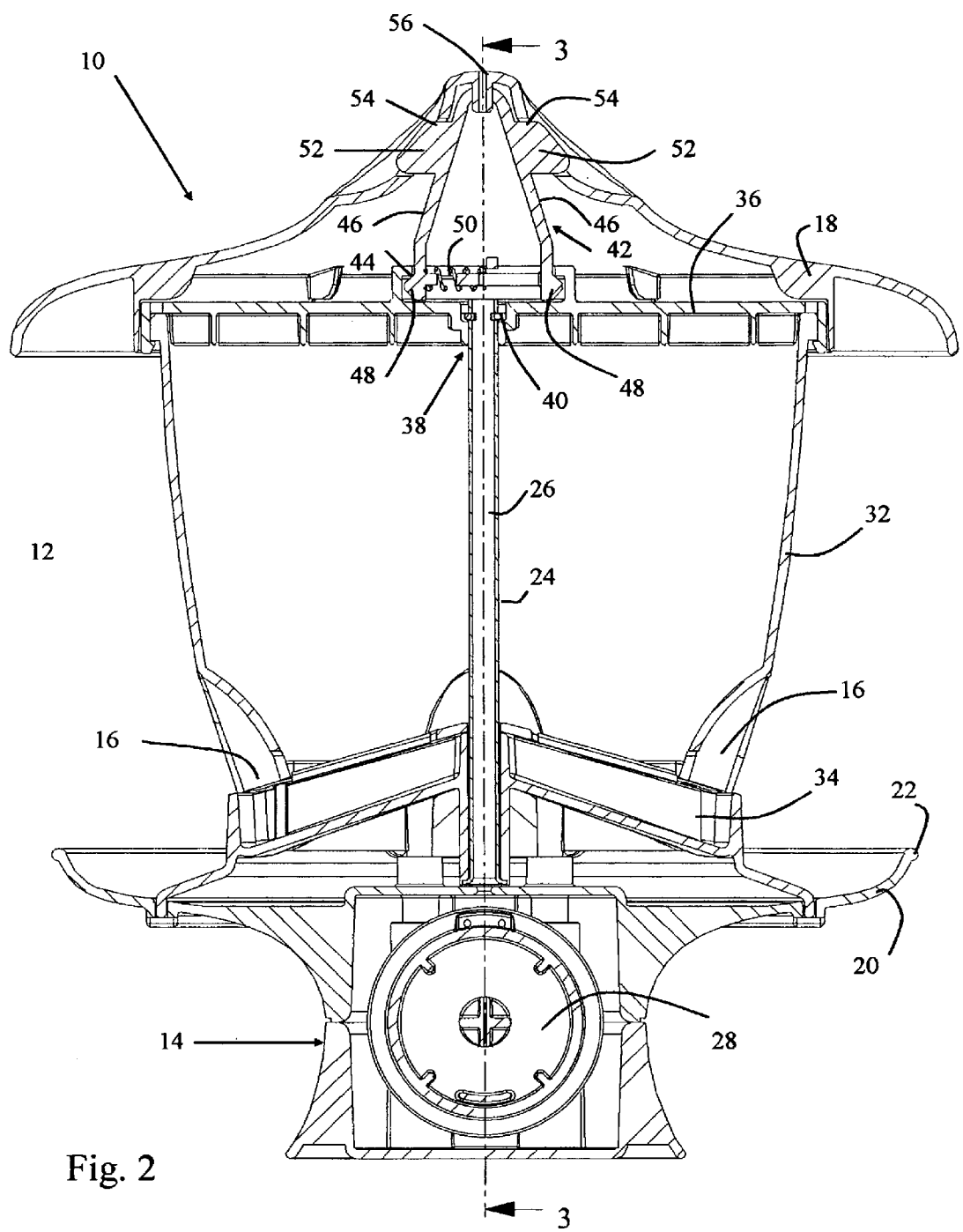
FIG. 2 is a cross-sectional view of the bird feeder of FIG. 1 taken through the vertical center line of the feeder.

FIG. 2 shows a cross-sectional view of bird feeder 10 including internal structure for hopper 12, housing 14 and cover 18. Also shown is a central conduit 24 passing through hopper 12 and along a central axis 26 of feeder 10. A cable reel 28 is located within housing 14 and adapted to feed a cable (not shown) through conduit 24. Cable reel 28 is shown centered with respect to central axis 26 to help maintain the balance of feeder 10. Hopper 12 generally includes an outer wall 32, which preferably has a circular cross section. Hopper 12 is closed at the bottom by a base 34, discussed below.

FIG. 2 also shows a cross member 36 located across the top of outer wall 32, extending between opposing portions of wall 32 and passing through central axis 26 of feeder 10. Cross member 36 includes a central opening 38 for allowing conduit 24 and a cable to pass therethrough. Cross member 36 is affixed to hopper 12 by upward pressure from outer wall 32 and by downward pressure from a C-clip 40 around central conduit 24.

Cover 18 is shown in FIG. 2 to include a releasable catch 42 adapted to releasably engage an annular lip 44 formed in a portion of cross member 36. Catch 42 has a flexible A-shape with opposed sides 46, which engage lip 44 at their respective ends 48. Sides 46 are additionally biased outwardly by a spring 50 to insure retention of cross member 36 by catch 42. Each catch side 46 also includes a protrusion which collectively form a pair of push buttons 52 extending through apertures 54 in cover 15. The application of opposing pressure on push buttons 52 causes inward movement of one or both end points 48 and the disengagement between catch 42 and cross member 36. Cover 18 also includes a central opening 56 in line with axis 26 to allow a cable to exit hopper 12. Just as hopper 12 and outer wall 32 preferably have a circular cross section, cover 18 is preferably circular, and the annular nature of lip 44 in cross member 36 allows the attachment of cover 18 to cross member 36 at any relative angular orientation around axis 24 and not just the relative angular orientation shown in FIGS. 2 and 3. This concentric arrangement of hopper 12 with central axis 26 helps to maintain balance of feeder 10 and especially when hopper 12 is full of bird feed.

Figure 3:
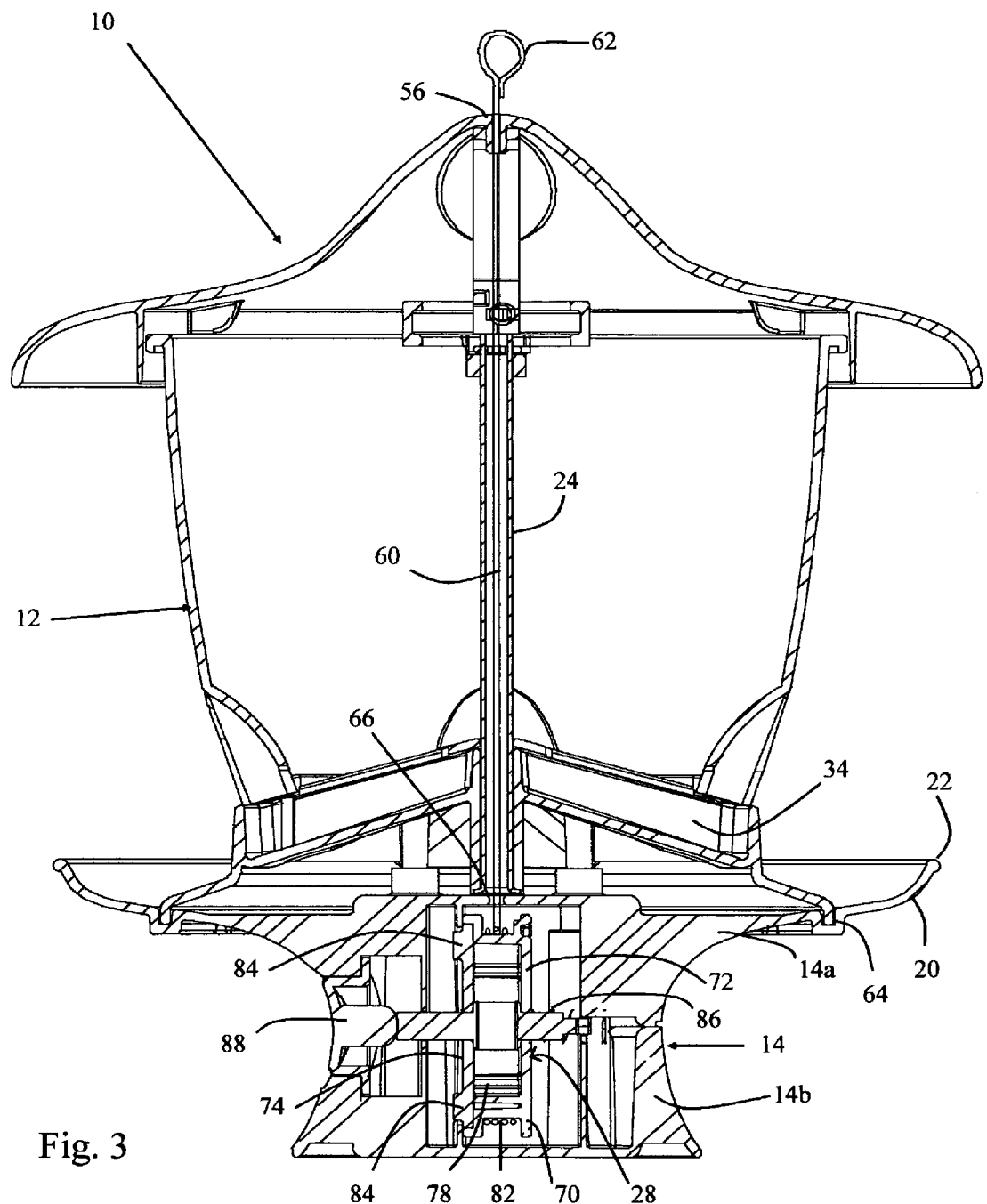
FIG. 3 is another cross-sectional view of the same bird feeder taken through the same vertical center line in the direction of arrows 3-3 of FIG. 2.

FIG. 3 shows another cross-sectional view of feeder 10 taken along view lines 3-3 of FIG. 2 and orthogonal to the view of FIG. 2. FIG. 3 shows the orthogonal view of cable reel 28 and also shows an associated cable 60 passing from cable reel 28 and through conduit 24 and cover 18. Cable 60 is terminated at its upper end with a loop 62 to facilitate hanging of feeder 10.

Housing 14 is shown in FIG. 3 to include an upper portion 14a and a lower portion 14b. Upper housing portion 14a includes dish-like extension 20 and is adapted to receive base 34 in an annular groove 64. Upper housing portion 14a also includes a central opening 66 adapted to allow passage of cable 60 from housing 14 into conduit 24.

Cable reel 28 is again shown centered with respect to feeder 10 and generally includes a cable drum 72 and an end plate 74 designed to house a wound spring 78 there between. Cable drum 72 and end plate 74 are rotationally mounted on an axel 80 to which one end of wound spring 78 is attached. The rotationally fixed mounting or capture of axel 80 between upper portion 14a and lower portion 14b of housing 14 enables the wound spring 78 to retract cable 60 on to the outer portion 82 of drum 72. End plate 74 is shown to have a pair of protrusions 84 adapted to engage complementary members of upper housing portion 14a and lower housing portion 14b to thereby provide a locking mechanism for cable reel 28 and maintain a selectable length for the portion of cable 60 extending from hopper 12. Axel 80 is prevented from rotating by its mounting or capture by upper housing portion 14a and lower housing portion 14b; however, axel 80 is provided with limited movement in its axial direction to enable the disengagement and engagement of protrusions 84 with respective elements of upper housing portion 14a and lower housing portion 14b. Cable reel 28 and axel 80 are biased by a spring 86 to maintain that engagement of protrusions 84 as shown. A translational member in the form of a push button 88 is located in contact with axel 80 along its axis to facilitate movement of axel 80 and cable reel 28 against the bias of spring 86 to disengage protrusions 84 and allow the rotation of cable drum 72 and the adjustment of cable 66 by either wound spring 78 or tension on cable 60.

Figure 4:
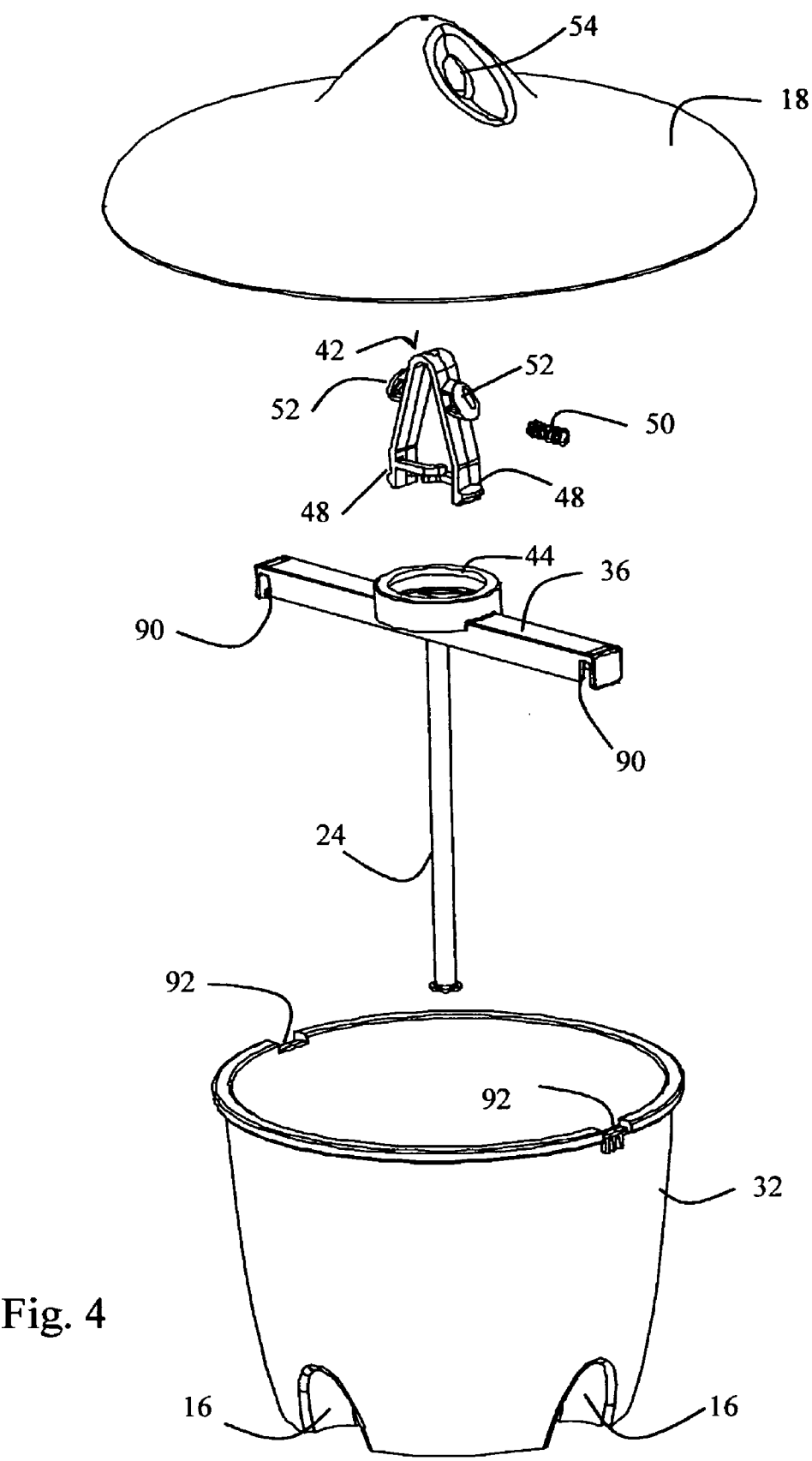
FIG. 4 is a partial exploded view of the upper portion of the bird feeder of FIGS. 1-3.

FIG. 4 shows an exploded view of the upper portion of feeder 10 (FIGS. 1-3) including cover 18, catch 42, spring 50, cross member 36, conduit 24 and outer wall 32. Cover 18 shows openings 54, which allow access to push buttons 52 of catch 42. Cross member 36 shows the annular lip 44, which allows engagement by the ends 48 of catch 42 regardless of the relative rotational alignment between cover 18 and cross member 36. Catch 42 may be sized and ends 48 may be shaped to enable a simple snap fit with annular lip 44 and avoid the necessity of pressing push buttons 52 for reattachment of cover 18. Cross member 36 also shows end notches 90, which are adapted to engage complementary notches 92 in the top of outer wall 32. Conduit 24 includes a flange 24a at its lower end to engage base 34 (FIGS. 2, 3 and 5).

Figure 5:
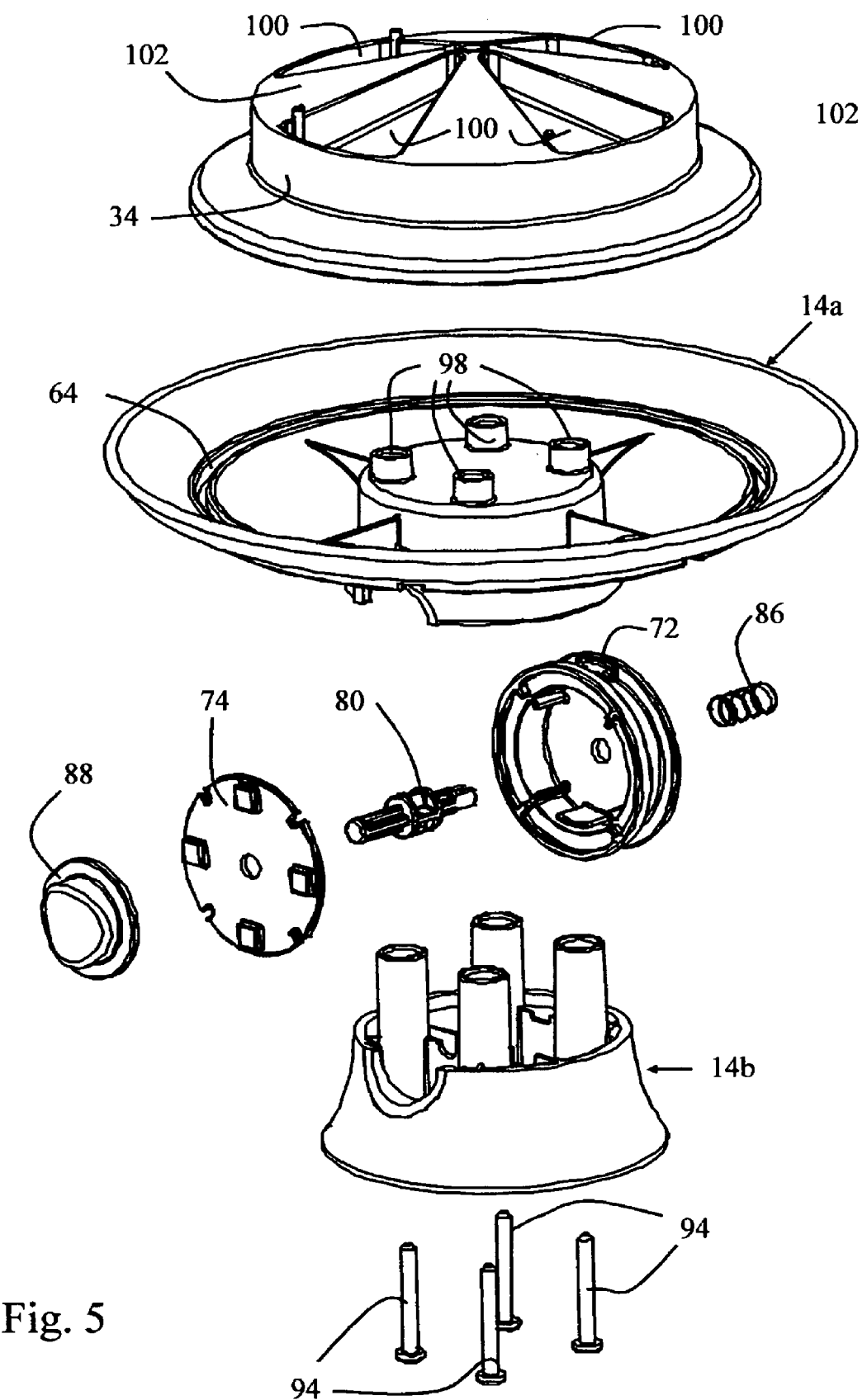
FIG. 5 is a partial exploded view of the lower portion of the bird feeder of FIGS. 1-3.

FIG. 5 shows an exploded view of the lower portion of feeder 10 (FIGS. 1-3) including hopper base 34, upper housing portion 14a, push button 88, end plate 74, axel 80, cable drum 72, spring 86, lower housing portion 14b, and four screws 94. Lower housing portion 14b is shown to include four cylindrical guides 96 for screws 94, and upper housing portion 14a is shown to include its own set of four holes or cylindrical guides 98 for screws 94.

Hopper base 34 is shown to have four depressions 100 formed in a top surface 102, which depressions 100 are equally angularly located around the circular shape of base 34 and intended to be aligned with feeding ports 16 (FIGS. 1-4) in outer wall 32 (FIGS. 2-4). This arrangement causes channeling of bird feed from the inside of hopper 12 to feeding ports 16. Hopper base 34 is constructed to include four appropriately located, threaded holes (not shown) for receiving and retaining screws 94. These are typically located between depressions 100.

During construction, conduit 24 is inserted upwardly through base 34. Cable 60 is fed through opening 66 (FIG. 3) of upper housing portion 14a and conduit 24, and upper housing portion 14a and lower housing portion 14b, along with cable reel 28 captured there between, are attached to base 34 by screws 94. Outer wall 32 is located on base 34 around central conduit 24. Cable 60 and conduit 24 are fed through central opening 38 of cross member 36, which is engaged with notches 92 in outer wall 32 and retained on central conduit 24 by C-clip 40. Cable 60 is also fed through catch 42 and cover 18 to allow the attachment of cover 18 to cross member 36 by catch 42.

Feeder 10 is mounted by applying tension to the loop 62 (FIG. 3) extending from cover 18 and simultaneously applying pressure to push button 88 to release cable reel 28 and determine an appropriate length for the extension of cable 60 from hopper 12. Feeder 10 is then filled by applying opposing pressure to pushbuttons 52 to release catch 42 from cross member 36 to allow cover 18 to be raised from hopper 12 along cable 60. Birds using feeder 10 typically perch on peripheral edge 22. Uneaten bird feed that falls from feeding ports 16 is typically caught by dish-like extension 20 so that birds may retrieve it without the danger of ground feeding. Having less uneaten feed reach the ground also reduces the interest of ground feeding animals.

The bird feeder of the present invention provides users with the convenience of being able to easily hang the feeder at the desired height and avoids the difficulty of making users tie reliable knots in weatherproof cord, which can be problematic. This bird feeder may also be easily repositioned so that users can easily experiment with different hanging locations and heights to determine the most desirable. Also users may easily move and/or reposition the feeder in response to seasonal changes. This bird feeder is provided with a suitable weatherproof cord which will not have to be replaced, even if the user does a great deal of repositioning of the feeder.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents. For example, the cable reed may be mounted above the feed hopper.

What is claimed is:

1. A bird feeder, comprising:
    a feed hopper constructed concentrically around a vertical central axis and having a plurality of feeding ports distributed around said central axis; and
    a cable reel mounted to said feed hopper and adapted to store and provide a length of cable for supporting said bird feeder along said central axis,
    said cable reel being a spring wound reel adapted to provide adjustability to the length of cable extending therefrom, said cable reel including a cable drum with a wound spring housed within the cable drum and an axle mounted within the cable drum to which one end of said wound spring is secured, and said cable drum and said axle being longitudinally displaceable in an axial direction from a locking mechanism so as to enable said cable drum to rotate and thereby deploy or recoil said cable.

2. The bird feeder of claim 1, wherein said cable reel is substantially centered along said central axis to help maintain balance of said bird feeder.

3. The bird feeder of claim 1, further comprising a housing located around said cable reel for esthetic purposes.

4. The bird feeder of claim 1, further comprising a spring disposed on an end of said axle opposite from said locking mechanism and configured to provide bias against said displacement of the cable drum and the axle.

5. A bird feeder, comprising:
    a feed hopper having a multiplicity of feeding ports distributed there around and a conduit located along a central axis through said hopper from an underside of said hopper; and
    a cable reel mounted to said underside of said feed hopper and adapted to feed a cable therefrom through said conduit and out of a top of said hopper, said cable reel and said cable being adapted to support said bird feeder by hanging with said cable,
    said cable reel being a spring wound reel configured to provide adjustability to a length of said cable that is deployable therefrom, said cable reel including a rotatable cable drum with a wound spring housed within the cable drum and an axle mounted within the cable drum, with one end of the wound spring being secured to said axle, said cable drum being rotatable about said axle, and said cable drum and said axle being longitudinally displaceable in an axial direction from a locking mechanism so as to release said cable drum from said locking mechanism and thereby enable said cable drum to rotate and adjust the deployed length of said cable.

6. The bird feeder of claim 5, wherein said cable reel is adapted to recoil said cable with said release from said locking mechanism.

7. The bird feeder of claim 5, further comprising a housing located around said cable reel for esthetic purposes and attached to a bottom of said hopper.

8. The bird feeder of claim 7, wherein said housing includes an upper portion having a centrally located opening allowing said cable to pass upwardly through said conduit from said cable reel.

9. The bird feeder of claim 8, wherein said upper portion of said housing includes a circumferential extension forming a dish-like member around a lower portion of said feed hopper and below said feeding ports.

10. The bird feeder of claim 9, wherein said dish-like member includes a peripheral edge adapted to function as a perch for birds.

11. The bird feeder of claim 8, wherein said housing includes a lower portion adapted for capturing said cable reel with attachment of said lower portion to said upper portion of said housing.

12. The bird feeder of claim 11, wherein said axle is adapted for rotationally fixed mounting between said upper and lower portions of said housing.

13. The bird feeder of claim 12, wherein said locking mechanism includes cable reel elements configured to engage complementary members of said upper and lower portions of said housing to prevent rotation of said cable drum.

14. The bird feeder of claim 13, further comprising a spring bias mechanism adapted to cause engagement between said cable reel elements and said housing.

15. The bird feeder of claim 14, wherein said cable reel is adapted to recoil said cable with disengagement between said cable reel elements and said housing.

16. The bird feeder of claim 5, wherein said feed hopper includes an outer wall with an open top end, and further comprising a cross member extending across said open top end and through said central axis of said feed hopper and having a centrally located opening for allowing said cable to pass therethrough.

17. The bird feeder of claim 16, wherein said cross member is adapted to engage said conduit in said centrally located opening of said cross member.

18. The bird feeder of claim 12, wherein said hopper includes a cover, and further comprising a releasable catch adapted to engage said cover and to releasably engage said cross member to releasably affix said cover to said top of said feed hopper to allow filling of said hopper.

19. The bird feeder of claim 18, wherein said releasable catch includes one or more push buttons extending through said cover and adapted to enable disengagement between said catch and said cross member.

20. The bird feeder of claim 18, wherein said cover includes a centrally located opening for allowing said cable to pass therethrough, and adapted to allow said cover to be raised from said feed hopper and along said cable.

21. A bird feeder, comprising:
    a feed hopper constructed concentrically around a vertical central axis and having a plurality of feeding ports distributed around said central axis;
    a spring wound cable reel configured to store and adjustably provide a length of a cable that is deployable therefrom for supporting said bird feeder; and
    a cable reel housing configured to house said cable reel, said cable reel housing being secured to said feed hopper,
    said cable reel including a rotatable cable drum with a wound spring housed within the cable drum and an axle mounted within the cable drum to which one end of said wound spring is secured, said cable drum being rotatable about said axle, and said cable drum and said axle being longitudinally displaceable in an axial direction from a locking mechanism so as to enable said cable drum to rotate and thereby deploy or retract said cable,
    said locking mechanism including protrusions on said cable drum that are configured to engage and disengage, as said cable drum and said axle are longitudinally displaced, complementary protrusion receiving portions in said cable reel housing.

* * * * *